(12) United States Patent
Pan et al.

(10) Patent No.: US 11,824,819 B2
(45) Date of Patent: Nov. 21, 2023

(54) ASSERTIVENESS MODULE FOR DEVELOPING MENTAL MODEL

(71) Applicant: INTERNATIONAL BUSINESS MACHINES CORPORATION, Armonk, NY (US)

(72) Inventors: Qian Pan, Canton, MA (US); James Johnson, Somerville, MA (US); Zahra Ashktorab, Brooklyn, NY (US); Dakuo Wang, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 17/648,941

(22) Filed: Jan. 26, 2022

(65) Prior Publication Data
US 2023/0239258 A1    Jul. 27, 2023

(51) Int. Cl.
*G06F 15/16*    (2006.01)
*H04L 51/02*    (2022.01)
(Continued)

(52) U.S. Cl.
CPC .............. *H04L 51/02* (2013.01); *G06F 3/048* (2013.01); *G06N 20/20* (2019.01)

(58) Field of Classification Search
CPC .......... H04L 51/02; G06N 20/20; G06F 3/048
(Continued)

(56) References Cited

U.S. PATENT DOCUMENTS

| 5,559,927 A | 9/1996 | Clynes |
| 5,987,415 A | 11/1999 | Breese |

(Continued)

FOREIGN PATENT DOCUMENTS

| CN | 110827796 A | 2/2020 |
| EP | 1415218 B1 | 2/2011 |

(Continued)

OTHER PUBLICATIONS

Brown, "A Decision Theoretic Approach for Interface Agent Development," Dissertation, Air Force Institute of Technology, 1998. pp. 1-190.

(Continued)

*Primary Examiner* — Lan Dai T Truong
(74) *Attorney, Agent, or Firm* — L. Jeffrey Kelly

(57) ABSTRACT

A method, a computer program product, and a computer system generate an accurate mental model of an automated agent. The method includes receiving an input from a user device associated with a user during a communication session between the user and the automated agent. The method includes determining a response to the input. The method includes determining a confidence score of the response relative to a confidence threshold. The method includes determining an assertiveness feature associated with the response, the assertiveness feature comprising an expression of the automated agent based on the confidence score. The method includes transmitting the response and the assertiveness feature to the user device, the expression configured to update anthropomorphic characteristics of a graphical representation of the automated agent shown on a graphical user interface of the communication session displayed on a display device of the user device.

18 Claims, 6 Drawing Sheets

(51) Int. Cl.
*G06N 20/20* (2019.01)
*G06F 3/048* (2013.01)

(58) Field of Classification Search
USPC .......................................................... 709/206
See application file for complete search history.

(56) References Cited

U.S. PATENT DOCUMENTS

| | | | |
|---|---|---|---|
| 6,658,388 | B1 | 12/2003 | Kleindienst |
| 7,415,100 | B2 | 8/2008 | Cooper et al. |
| 7,457,752 | B2 | 11/2008 | Oudeyer |
| 7,904,297 | B2 | 3/2011 | Mirkovic et al. |
| 8,149,241 | B2 | 4/2012 | Do et al. |
| 9,177,318 | B2 | 11/2015 | Shen |
| 9,640,180 | B2 | 5/2017 | Chen |
| 9,652,809 | B1 | 5/2017 | Levinson |
| 10,079,029 | B2 | 9/2018 | Amini |
| 10,176,808 | B1 | 1/2019 | Lovitt |
| 10,372,825 | B2 | 8/2019 | Herzig |
| 10,536,402 | B2 | 1/2020 | Galley |
| 10,592,609 | B1 | 3/2020 | Tucker |
| 10,608,965 | B2 | 3/2020 | Dey |
| 10,621,983 | B2 | 4/2020 | Bromand |
| 10,635,462 | B2 | 4/2020 | Vangala |
| 10,755,712 | B2 | 8/2020 | Kakkar |
| 10,789,429 | B2 | 9/2020 | Zhao |
| 11,138,388 | B2 | 10/2021 | Emery |
| 2009/0055190 | A1 | 2/2009 | Filev |
| 2011/0283190 | A1* | 11/2011 | Poltorak ................ G06F 16/435 704/258 |
| 2012/0239743 | A1* | 9/2012 | Gunsay .................. G06Q 50/01 709/204 |
| 2017/0069340 | A1 | 3/2017 | Nowson |
| 2017/0148073 | A1 | 5/2017 | Nomula |
| 2017/0206095 | A1 | 7/2017 | Gibbs |
| 2017/0351330 | A1 | 12/2017 | Gordon |
| 2018/0216946 | A1 | 8/2018 | Gueye |
| 2018/0374000 | A1 | 12/2018 | Herzig et al. |
| 2019/0202063 | A1 | 7/2019 | Shukla |
| 2020/0279553 | A1 | 9/2020 | Mcduff |
| 2020/0302952 | A1 | 9/2020 | Pinkus |
| 2021/0192824 | A1* | 6/2021 | Chen ...................... H04L 51/02 |
| 2023/0076849 | A1* | 3/2023 | Matsuoka ........ G06Q 10/06316 |

FOREIGN PATENT DOCUMENTS

| | | |
|---|---|---|
| GB | 2574035 A | 11/2019 |
| KR | 20190016855 A | 2/2019 |
| KR | 102168802 B1 | 10/2020 |
| WO | 2015003180 A1 | 1/2015 |
| WO | 2021005551 A1 | 1/2021 |
| WO | 2021144750 A | 7/2021 |

OTHER PUBLICATIONS

Disclosed Anonymously, "Chatbot Orchestration Optimizer," IPCOM000262983D, IP.com, Jul. 18, 2020, 2 pages.

Gandrabur, Simona et al., "Confidence estimation for NLP applications." https://dl.acm.org/doi/abs/10.1145/1177055.1177057, ACM Transactions on Speech and Language Processing (TSLP) 3.3 (2006): pp. 1-29.

Gero, et al., "Mental Models of AI Agents in a Cooperative Game Setting.", http://www.katygero.com/papers/2020_Mental-ModelsofAIAgents.pdf, Proceedings of the 2020 CHI Conference on Human Factors in Computing Systems, 2020, pp. 1-12.

Mell et al., "The NIST Definition of Cloud Computing", National Institute of Standards and Technology, Special Publication 800-145, Sep. 2011, pp. 1-7.

Su,, et al., "Put Chatbot into Its Interlocutor's Shoes: New Framework to Learn Chatbot Responding with Intention", arXiv preprint arXiv:2103.16429 (2021), 11 pages.

Zhang, Yunfeng et al., "Effect of confidence and explanation on accuracy and trust calibration in AI-assisted decision making." https://dl.acm.org/doi/abs/10.1145/3351095.3372852, Proceedings of the 2020 Conference on Fairness, Accountability, and Transparency. 2020, pp. 1-11.

Zhou., et al. "Trusting virtual agents: the effect of personality.", https://dl.acm.org/doi/abs/10.1145/3232077, ACM Transactions on Interactive Intelligent Systems (TiiS) 9.2-3 (2019), pp. 1-36.

* cited by examiner

ASSERTIVENESS MODULE FOR DEVELOPING MENTAL MODEL

BACKGROUND

The exemplary embodiments relate generally to communication sessions, and more particularly to exchanging communications between a user and an automated agent.

A user may contact an enterprise for various reasons. The enterprise may have a contact center that directs a communication from the user to an appropriate person, department, outside party, etc. The contact center may employ a live agent who is a person trained to handle communications from users and provide appropriate responses. The contact center may also utilize an automated agent that is an automated system configured to receive inputs and provide computer generated responses based on models and/or other programmable training. While communicating with an entity of the contact center, a user may consciously or sub-consciously develop a mental model of the entity with whom the user is communicating (e.g., the live agent or the automated agent).

There have been many different conventional approaches to utilizing automated agents, whether at a contact center or for any other purpose requiring communications with a user and providing responses. However, the conventional approaches may not provide sufficient tools to effectively help users lacking knowledge of the underlying system to develop an appropriate mental model to interact with the automated agent successfully. For example, a conceptual model of the conventional approaches may define a design of that system. The conceptual model may lack the appropriate conveyance of information to the user resulting in an inaccurate mental model. Furthermore, the conventional approaches often create a mismatch between a user's mental model and a target system's conceptual model that results in the target system being more difficult to learn and use, ultimately leading to an unsatisfactory and inefficient experience with the automated agent and the system as a whole.

There are numerous conventional approaches that attempt to create an automated agent to converse with a user through a dynamic selection of responses such as according to a preference or personality of the user. For example, U.S. Pat. No. 9,177,318 describes a conventional approach in which a set of automatic statements are generated based on a user's statement and the system uses a user's behavior characteristic to calculate and select a response having a highest relevance score. In another example, U.S. Pat. No. 9,640,180 and U.S. Publ. Appln. No. 2017/0148073 describe conventional approaches in which an input is received from a user and processed to determine the user request and perform subsequent actions. In a further example, U.S. Publ. Appln. No. 2018/0374000 extracts a customer's personality traits to determine a customer satisfaction and use this information to optimize a virtual agent's behavior for future conversations. In yet another example, conventional approaches most often utilize predefined responses, particularly when the user input is not entirely understood by the automated agent (e.g., "Sorry, I don't understand. Please check your spelling."). Such responses do not allow the communications to continue but keep the communications stagnant on this same point. The conventional approaches for automated agents are directed to enabling these automated agents to recognize a user's emotion and/or behavior to better adapt to a user's need. However, the conventional approaches do not provide any techniques to enable a user to recognize the limitations of technology, with particular regard to the system that the user is communicating, so that the system may properly adapt to the behaviors of the user and improve interaction with established systems.

SUMMARY

The exemplary embodiments disclose a method, a computer program product, and a computer system for generating an accurate mental model of an automated agent. The method comprises receiving an input from a user device associated with a user during a communication session between the user and the automated agent. The method comprises determining a response to the input. The method comprises determining a confidence score of the response relative to a confidence threshold. The method comprises determining an assertiveness feature associated with the response, the assertiveness feature comprising an expression of the automated agent based on the confidence score. The method comprises transmitting the response and the assertiveness feature to the user device, the expression configured to update anthropomorphic characteristics of a graphical representation of the automated agent shown on a graphical user interface of the communication session displayed on a display device of the user device.

In a preferred embodiment, the assertiveness feature further comprises a tone to be applied to the response, the tone including a use of corresponding terms indicative of the confidence value.

In a preferred embodiment, the response includes a further statement assuming the response correctly addresses the input.

In a preferred embodiment, the assertiveness feature further comprises a mental model intervention, the mental model intervention including knowledge distribution information of the automated agent.

In a preferred embodiment, the assertiveness feature further comprises a confidence gauge indicating the confidence score associated with the response.

In a preferred embodiment, the method further comprises retraining a model from which the confidence score is determined, from which the assertiveness feature is determined, or a combination thereof, based on the communication session.

In a preferred embodiment, the expression is one of confusion as a result of the confidence score not satisfying the confidence threshold or understanding as a result of the confidence score satisfying the confidence threshold.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
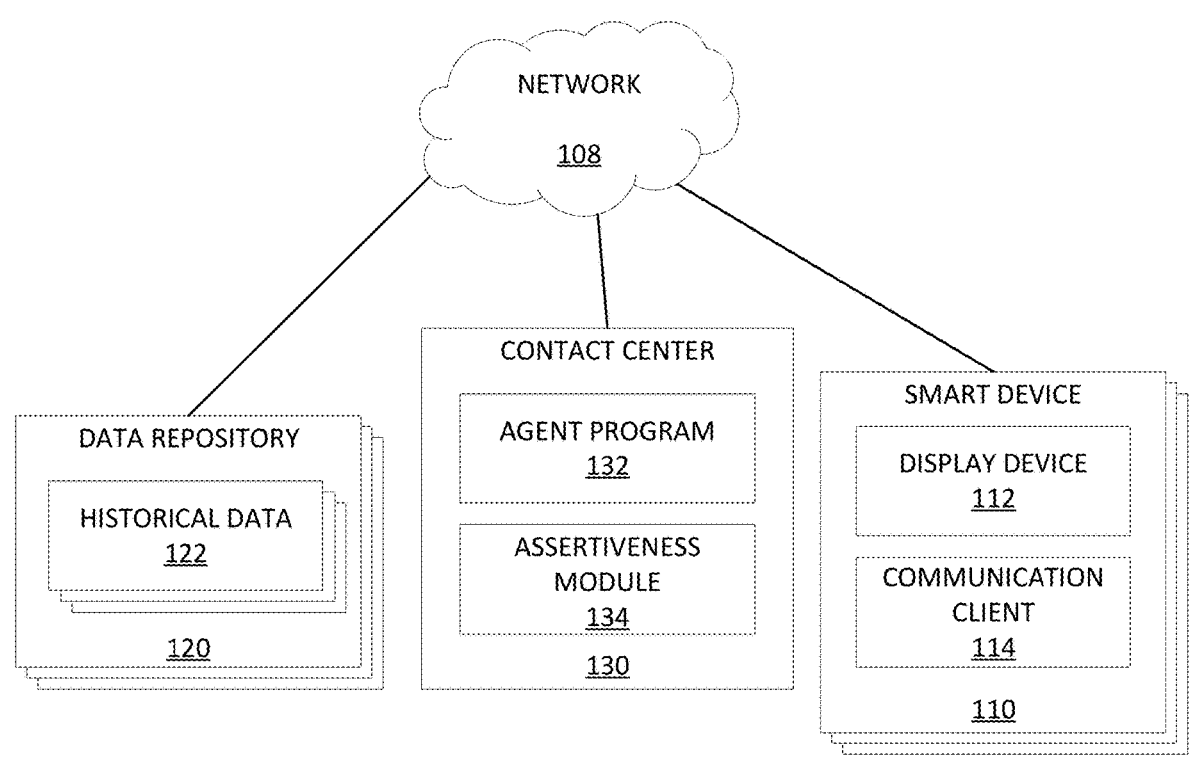
FIG. 1 depicts an exemplary schematic diagram of an agent response system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for generating an accurate mental model of an automated agent. The exemplary embodiments provide a mechanism that enhances interactions between a user and the automated agent through improving the user's mental model of the system. As will be described in further detail below, the exemplary embodiments may enhance the interactions and communications between the user and the automated agent through a plurality of features determined by an assertiveness module including a tone of responses provided by the automated agent, a mental model intervention providing information that shapes the development of the mental model, an agent personality representation to graphically illustrate a current state of the automated agent, and a confidence score conveying an understanding metric of the automated agent for the current communication. Key benefits of the exemplary embodiments may include generating anthropomorphic properties for the automated agent to positively influence a user's perception of the system, providing a knowledge distribution of the system and the automated agent to improve a user's mental model, and enabling the automated agent to respond with a strong and consistent personality with an appropriate assertiveness while creating a positive social interaction and efficient communication to achieve a goal. Detailed implementation of the exemplary embodiments follows.

The exemplary embodiments are described with particular reference to contact centers utilizing automated agents. However, the use of the contact center and the automated agent is only exemplary. The exemplary embodiments may be utilized in any environment in which a user may reach to ascertain information where the environment utilizes system generated responses to identify the request and provide the appropriate response.

The exemplary embodiments are also described with regard to mental models and conceptual models. As one skilled in the art will understand, a mental model may represent an individual's thought process and perception of how a given target system operates. The mental model may evolve during an interaction with the target system. The mental model is mostly developed subconsciously, based on incomplete facts, past experiences, and even intuitive perceptions which may or may not be correct. The exemplary embodiments incorporate mental models in the features thereof such that improvements to a mental model's accuracy may aid users to better adjust expectations, to more closely match a target system's conceptual model, resulting in higher user satisfaction with the target system and successful interaction outcomes. As one skilled in the art will understand, a conceptual model may represent a design and construction of a target system. The conceptual model may develop over time by experts and administrators during development of the target system. The conceptual model presents itself to a user via an interface design of the underlying target system.

FIG. 1 depicts an agent response system 100, in accordance with the exemplary embodiments. According to the exemplary embodiments, the agent response system 100 may include a smart device 110, one or more data repositories 120, and a contact center 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the agent response system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the agent response system 100 that do not utilize the network 108.

In the exemplary embodiments, the smart device 110 may include a display device 112 and a communication client 114, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 5 (e.g., data processing according to the exemplary embodiments being performed by processor 02), as part of a cloud implementation with reference to FIG. 6 (e.g., the device 110 according to the exemplary embodiments being represented by the laptop computer 54C), and/or as utilizing functional abstraction layers for processing with reference to FIG. 7 (e.g., workload layer 90 including assertiveness processing 96 according to the exemplary embodiments). The smart device 110 may be utilized by a medical professional who enters information about a patient to update a record of that patient.

In the exemplary embodiments, the display device 112 may be any device configured to show visual information to a user of the smart device 110. As the exemplary embodiments are directed to a communication between a user of the smart device 110 and an automated agent of the contact center 130, the user may view a graphical user interface (GUI) shown on the display device 112 that shows communications that are exchanged. The display device 112 may also show further graphical representations such as an anthropomorphic representation of the automated agent with regard to a confidence level of its responses, as will be described in further detail below.

In the exemplary embodiments, the communication client 114 may act as a client in a client-server relationship and may be a software, hardware, and/or firmware based application utilized by a user wishing to reach the contact center 130 that is capable of establishing and performing a communication session via the network 108. In embodiments, the communication client 114 may provide a user interface (e.g., a GUI) allowing the user of the smart device 110 to interact with one or more components of the communication transfer system 100, and utilize various wired and/or wireless connection protocols for data transmission and exchange associated with establishing and performing a communication session, including Bluetooth, 2.4 gHz and 5 gHz internet, near-field communication, Z-Wave, Zigbee, etc.

The communication client 114 may be configured to allow the user of the smart device 110 to reach the contact center 130. Accordingly, the communication client 114 may establish a communication session and allow the user to communicate with the contact center to resolve a task (e.g., request information, submit a request, etc.). The communication client 114 may provide a user interface in which the user may enter identification information (e.g., entered just prior to the communication session, entered upon installing the communication client 114, etc.) corresponding to the contact center 130 or the enterprise linked to the contact center 130. In this manner, the user may be identified and information associated with the user may retrieved. The communication client 114 may transmit the identification information at any time the identity of the user may be required. The communication client 114 may be configured to establish a variety of types of communication sessions. For example, the communication session may be a text based communication (e.g., a chat session, a text message session, etc.), an audio based communication (e.g., a phone call), a video based communication (e.g., a video call), a web based communication (e.g., a chat session via a web browser interface), etc. Regardless of the type of communications used in the communication session, the communication client 114 may provide the GUI in which the communications may be viewed by the user as well as the features of the exemplary embodiments.

In the exemplary embodiments, the data repository 120 may include one or more historical data 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the data repository 120 is shown as a single device, in other embodiments, the data repository 120 may be comprised of a cluster or plurality of electronic devices, in a modular manner, etc., working together or working independently. While the data repository 120 is also shown as a separate component, in other embodiments, the data repository 120 may be incorporated with one or more of the other components of the agent response system 100. For example, the data repository 120 may be incorporated in the contact center 130. Thus, access to the data repository 120 by components of the contact center 130 may be performed locally. The data repository 120 is described in greater detail as a hardware implementation with reference to FIG. 5, as part of a cloud implementation with reference to FIG. 6, and/or as utilizing functional abstraction layers for processing with reference to FIG. 7.

In the exemplary embodiments, the historical data 122 may include any recorded data from prior communication sessions with users interacting with the contact center 130. As will be described in further detail below, the historical data 122 may provide a basis upon which to train models and/or learning processes such that the features according to the exemplary embodiments may be provided with greater accuracy. For example, the models and/or learning processes may include RNNs, CNNs, machine learning, etc.

In the exemplary embodiments, the contact center 130 may include an agent program 132 and an assertiveness module 134 and may comprise various components such as an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the contact center 130 is shown as a centralized location including the various components, in other embodiments, the contact center 130 may be comprised of a cluster or plurality of electronic devices, in a modular manner, in a remote manner, etc., working together or working independently. The components of the contact center 130 are described in greater detail as a hardware implementation with reference to FIG. 5 (e.g., data processing according to the exemplary embodiments being performed by processor 02), as part of a cloud implementation with reference to FIG. 6 (e.g., one of the components of the contact center 130 according to the exemplary embodiments being represented by the desktop computer 54B), and/or as utilizing functional abstraction layers for processing with reference to FIG. 7 (e.g., workload layer 90 including assertiveness processing 96 according to the exemplary embodiments).

The agent program 132 may act as a client in a client-server relationship and may be a software, hardware, and/or firmware based application that provides an automated agent that automatically generates communications exchanged with the user of the smart device 110 during the communication session. The exemplary embodiments are described herein where the terms agent program 132 and automated agent may be used interchangeably. The agent program 132 may be configured in a variety of manners that support the various types of communications that are allowed by the contact center 130 for communication sessions. The agent program 132 may be configured with natural language processing components and/or other language processing protocols to process inputs from the user and determine how to converse with the user of the smart device 110.

The agent program 132 may also be configured to determine actions to be taken based on an identified task to be performed. The agent program 132 may be configured with scripted actions when the task has been positively identified. For example, when the task is identified as retrieving and providing information to the user, the agent program 132 may query the appropriate database to retrieve the specified piece of information which is then communicated to the user and viewed by the user via the communication client 114 on the display device 112.

In the exemplary embodiments, the assertiveness module 134 may be a software, hardware, and/or firmware application configured to provide a plurality of assertiveness features in conveying information to a user during a communication session. As will be described in further detail below, the assertiveness features according to the exemplary embodiments may include utilizing an appropriate assertive tone to responses for the user to properly develop a mental model of the automated agent, providing a mental model intervention including information used to also develop the mental model of the automated agent, generating a graphical representation of the automated agent with anthropomorphic properties, providing a confidence gauge or level with regard to how confident the automated agent's responses are to the user's inputs, or a combination thereof.

Figure 2:
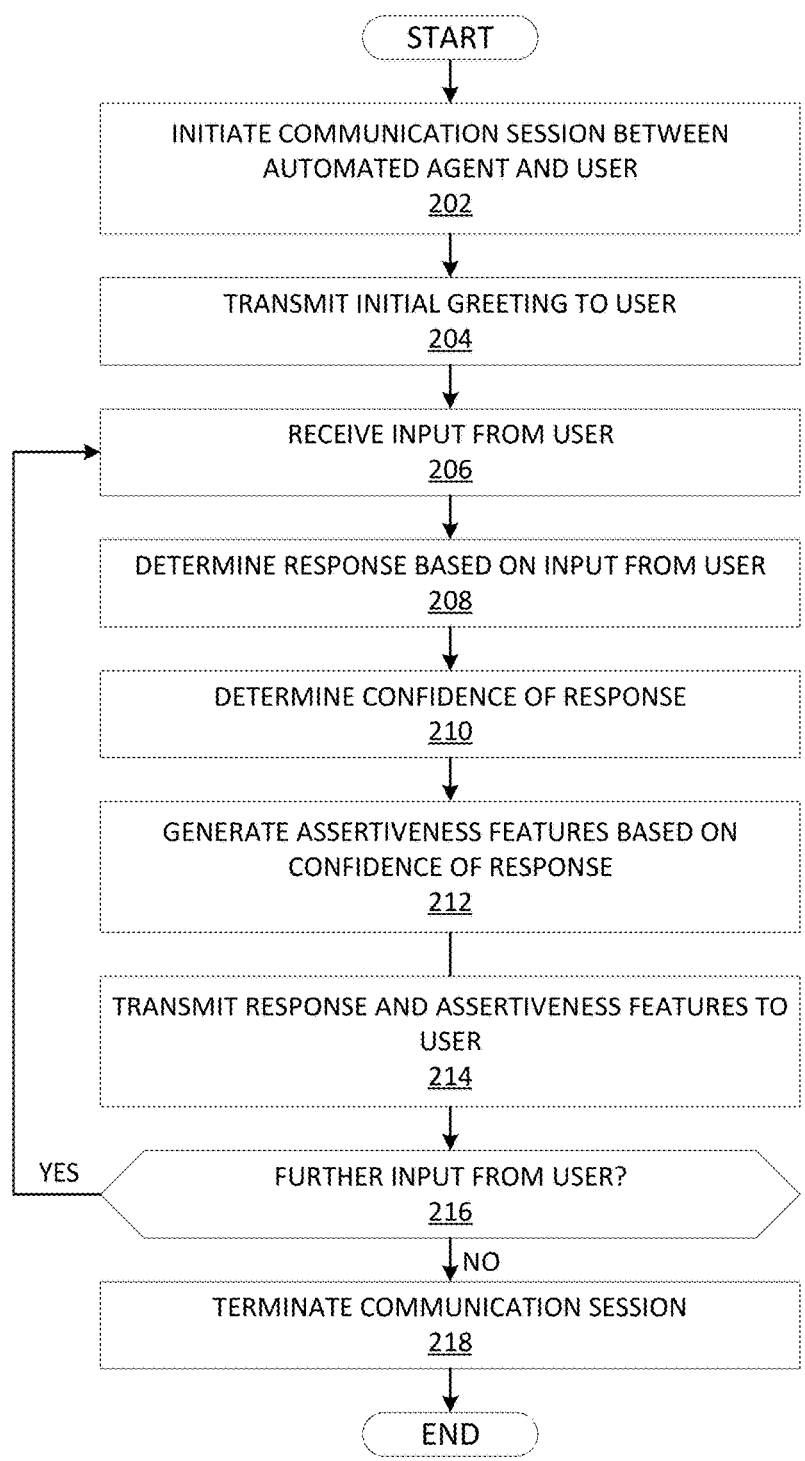
FIG. 2 depicts an exemplary flowchart of a method 200 illustrating the operations of an assertiveness module 134 incorporated in the agent response system 100 in generating an accurate mental model of an automated agent, in accordance with the exemplary embodiments.

FIG. 2 depicts an exemplary flowchart of a method 200 illustrating the operations of the assertiveness module 134 incorporated in the agent response system 100 in generating an accurate mental model of an automated agent, in accordance with the exemplary embodiments. The method 200 may relate to operations that are performed by the automated agent of the contact center 130 by incorporating the operations of the assertiveness module 134. The method 200 will be described from the perspective of the automated agent and the contact center 130.

The automated agent may initiate a communication session between the automated agent and the user (step 202). The user may utilize the communication client 114 on the smart device 110 to reach the contact center 130 via the network 108. The automated agent may be configured to establish the communication session with the user and begin communications. For example, the automated agent may transmit an initial greeting to the user (step 204). The initial greeting may be a common greeting communication (e.g., "Hello!") as well as a question as to the purpose of the user has requested the communication session (e.g., "How can I help you today?"). The automated agent may receive an input from the user (step 206). For example, the user may indicate the purpose of the communication session (e.g., to resolve an account issue, to request information, etc.).

The automated agent may determine a response based on input from the user (step 208). The automated agent may be configured to process the input from the user. For example, the input may be received as a text based communication. The automated agent may utilize natural language processing (NLP) to determine a context of the input. In another example, the input may be received as an audio based communication. The automated agent may convert the audio based communication to a text based communication through an audio to text conversion operation and utilize NLP to determine a context of the input. Once the context of the input is determined, the automated agent may utilize models trained through initial parameters and/or the historical data 122 to determine a context of an appropriate response to the input from the user. Those skilled in the art will understand the various techniques that may be used to determine the response and may incorporate any such techniques. For example, the user may enter an input for a request of information. The automated agent may determine the context for the request and locate the appropriate database that includes the specific information being requested. In determining the context of the response, the automated agent may perform subsequent operations to incorporate the assertiveness features according to the exemplary embodiments prior to formulating the response to be provided to the user.

The automated agent may determine a confidence score of the context of the response (step 210). The automated agent may utilize one or more of a plurality of techniques to determine the confidence score for a determined context of the response. For example, the automated agent may utilize a confidence score architecture utilizing embeddings where a word embedding technique associates an analogy of a pair of words with an array of numbers where the numbers are the result of training models of historical and/or preliminarily entered base metrics. According to an exemplary implementation, the automated agent may abstract data of the input from the user into a first embedding. The automated agent may then abstract determined out data from the results of first embedding operation into a second embedding. The automated agent may further abstract trained data into a third embedding. Based on the results of the embeddings, the automated agent may determine the confidence score based on the first, second, and third embeddings (e.g., as a product) where the confidence score is within a predetermined confidence range (e.g., 0 to 1 where 0 is no confidence and 1 is absolute confidence). Those skilled in the art will understand the various other mechanisms that may be used in determining the confidence score where the confidence score may be estimated for NLP applications.

The automated agent may generate assertiveness features based on the confidence score of the determined response (step 212). As described above, the assertiveness features may include one or more of the following: utilizing an appropriate assertive tone reflective of the confidence score in formulating responses to the input from the user, providing a mental model intervention in the form of useful information about the automated agent such as capability information (e.g., tasks that the automated agent is configured to resolve), generating a graphical representation of the automated agent with anthropomorphic properties where anthropomorphic characteristics reflect the confidence score, and providing a confidence gauge indicating the confidence score.

The assertiveness features address various issues and/or preferences that users have expressed in interacting with automated agents. For example, anthropomorphic properties of automated agents may positively influence a user's perceptions of, attitude toward, and behavior with target systems, as well as influence an evaluation of the automated agent's intelligence, social attraction, and other skills. In another example, interventions that communicate the knowledge distribution of the automated agent may improve mental models developed by the user of the automated agent and improve the individual interaction as well as the overall communication session. In a further example, users may favor an automated agent with strong, consistent personality expressed in communications from the automated agent. In yet another example, automated agents with anthropomorphic properties may elicit more positive social interaction and increase user satisfaction during the interactions and communication session. In an additional example, displaying the degree to which the automated agent is confident of its response may help users negotiate improved interactions with the automated agents.

In light of the above, the exemplary embodiments provide the assertiveness features that represent the confidence of the response in an actual way as well as a representative way. With an increasing need to require users to collaborate with automated agents, the assertiveness features provide a method via GUI design to help the user better understand the automated agent and develop an improved mental model of the target system (e.g., the contact center 130) utilizing the automated agent during each interaction as well as the communication session to improve an overall efficiency. The assertiveness features of the exemplary embodiments also apply anthropomorphic properties to the automated agent displayed in the GUI to help build up rapport between the user and the automated agent to promote positive and effective interactions. For example, an expression determined to be expressed by a graphical representation of the automated agent may be updated with each communication from the automated agent based on a confidence score. The more direct display of the confidence score corresponding to responses may further aid the user in developing an understanding of the automated agent's ability to provide useful assistance. The assertiveness features additionally providing a mental model intervention based on knowledge distribution may also help the user to develop an understanding of the automated agent's ability to provide useful assistance. Exemplary scenarios of providing the assertiveness features based on different confidence scores will be described in further detail below with regard to FIGS. 3 and 4.

With regard to the assertiveness feature of utilizing an appropriate assertive tone reflective of the confidence score of the response, the automated agent may be configured to dynamically utilize terminology, jargon, connotations, etc. that are known to convey a particular tone. For example, positive absolute terms and characters (e.g., "Sure!") may convey that the automated agent is highly confident in its response. In another example, vague terms and characters (e.g., crutch words like "um", questions that verify a context, etc.) may convey that the automated agent is not as confident in its response. In this manner, the assertiveness feature may determine a manner in which to generate an appropriate response that is indicative of the confidence score.

The assertiveness feature may additionally include further responses to more efficiently progress the communication session. In scenarios where the confidence score of the response is relatively low (e.g., less than 0.5, less than 0.3, etc.). The assertiveness feature may compose a more human-like response with a low assertive tone and/or non-verbal cues to further discuss and clarify the user's intent. In this manner, the user may feel that the communication session is at least partially progressing forward towards the ultimate goal rather than being stagnant on a previously raised point, from the perspective of the user. For example, in contrast to such a feature, conventional approaches may simply indicate that the input from the user is not understood and to please provide a clearer input which results in the user feeling as if the same point is being discussed with no progress being made. The assertiveness feature may also further progression of the communication session based on an assumption that the response is correct despite the low confidence score. The assertiveness feature may provide the response as described above (e.g., a question confirming the context) along with a further statement or question that would be asked if the response were indeed correct. This may further provide a sense to the user that the communication session is progressing toward the user's ultimate goal of resolving a task.

In providing the assertiveness features, the automated agent may be configured with one or more confidence thresholds. For example, in a simplest implementation, there may be one confidence threshold (e.g., 0.5) where responses with a confidence score that at least meet the confidence threshold are presented with a high assertiveness while responses with a confidence score that do not meet the confidence threshold are presented with a low assertiveness. In another example, a more complex threshold scheme may be used where a plurality of confidence thresholds indicates the appropriate level of assertiveness to be used in the assertiveness features. In this exemplary implementation, there may be N confidence thresholds having N+1 ranges of confidence scores where each range of confidence scores is indicative of the assertiveness to be used in the assertiveness features. For example, with three confidence thresholds spaced equally apart (e.g., 0.25, 0.5, and 0.75), there may be four ranges of confidence scores (e.g., 0 to 0.24, 0.25 to 0.49, 0.5 to 0.74, and 0.75 to 1). The range from 0 to 0.24 may be indicative of a very low assertiveness where responses are presented to convey that little has been understood of the input from the user (e.g., "Um . . . can you please confirm that you would like to have issue X resolved."); the range from 0.25 to 0.49 may be indicative of a low assertiveness but may present responses with some level of understanding of the context of the input from the user (e.g., "It seems you want to have issue X resolved."); the range from 0.5 to 0.74 may be indicative of a high assertiveness where responses are presented to convey a high likelihood of understanding of the context of the input from the user (e.g., "I can help you with resolving issue X. Please provide information Y."

which presents with a relatively high confidence but also allows the user to correct the automated agent); and the range from 0.75 to 1 may be indicative of a very high assertiveness where responses are presented to convey a total understanding of the context of the input from the user (e.g., "Sure! I will need you to provide information Y.").

The automated agent may transmit the formulated response along with the assertiveness features to the user (step 214). The response may be read by the user on the display device 112 via the GUI provided by the communication client 114. The assertiveness features may also be seen by the user. As described above, the user may view the assertiveness features may develop a more accurate mental model of the automated agent resulting in more efficient interactions and a more positive experience with the automated agent.

The automated agent may determine whether there is a further input from the user (decision 216). For example, the response from the automated agent may have resolved the issue for which the user is reaching the contact center 130. As a result of no further input from the user (decision 216, "NO" branch), the automated agent may terminate the communication session (step 218). In another example, the response from the automated agent may be a question to ascertain further information such that at least one more input from the user is required. As a result of a further input from the user (decision 216, "YES" branch), the automated agent may continue to provide responses with corresponding assertiveness features until the communication session concludes. In this manner, each communication from the automated agent may be provided with respective assertiveness features.

The above process is described with regard to respective assertiveness features being provided for each communication from the automated agent. In such an implementation, the user may freely navigate to one of the previous communications to display the corresponding assertiveness features associated with a selected one of the previous communications. However, the use of individual assertiveness features is only exemplary. In another manner, the assertiveness features may reflect the confidence of the automated agent for the communication session in a holistic manner. Accordingly, the assertiveness features may be updated with each communication from the automated agent. The exemplary embodiments may be configured with an option for the user to select between such views where the user may toggle the assertiveness features for individual communications or the communication session as a whole. If the user is comfortable with a more cluttered look, the exemplary embodiments may also show the assertiveness features for both the individual communications as well as the communication session as a whole.

To further illustrate the operations of the assertiveness module 134, reference is now made to illustrative exemplary embodiments. Initially, a conventional approach may simply rely on fallback, predefined responses when the confidence of a response does not satisfy a confidence threshold. For example, the conventional approach may simply respond with "I do not understand your question." In another example, the user may have entered an input with typographical errors where certain terms are not registered as words in the automated agent's dictionary such that the conventional approach may simply respond with "Sorry, I don't understand. Could you check your spelling?" Thus, the potential response to provide to an input from a user having a low confidence (e.g., does not meet a confidence threshold) may always rely on these predefined responses when the automated agent does not have sufficient confidence in understanding the input from the user or cannot find a correct response with sufficient confidence. However, the exemplary embodiments may provide assertiveness features that may respond to any scenario to any level of confidence in the responses to inputs from the user.

Figure 3:
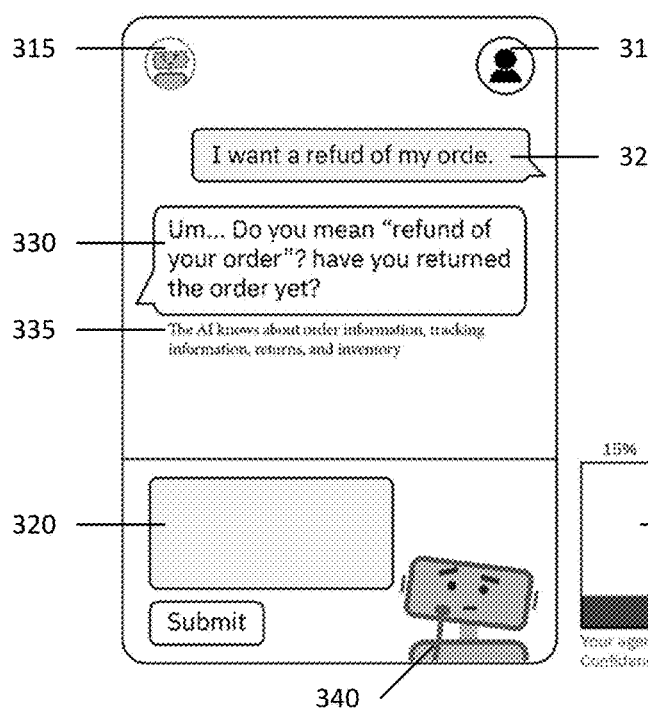
FIGS. 3 and 4 depict exemplary scenarios in which the assertiveness features are provided, in accordance with the exemplary embodiments.
Figure 4:
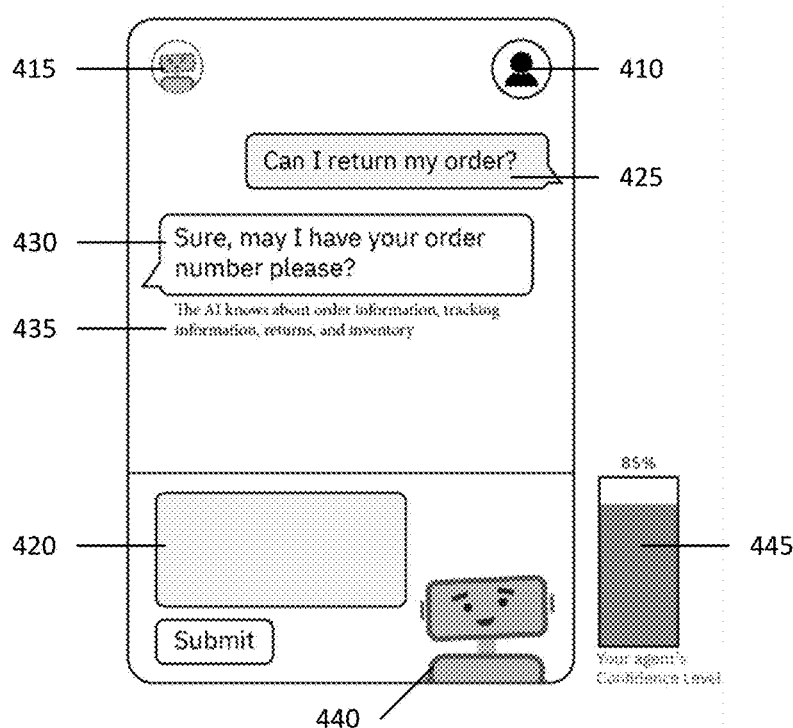

FIGS. 3 and 4 depict exemplary scenarios 300, 400, respectively, in which the assertiveness features are provided, in accordance with the exemplary embodiments. FIG. 3 is directed to the exemplary scenario 300 where a response to a user input has a relatively low confidence score. As illustrated in the exemplary scenario 300, a GUI 305 includes a user avatar 310, an automated agent avatar 315, an input text box 320, a user communication 325, an automated agent communication 330, intervention information 335, an anthropomorphic graphic representation 340 of the automated agent, and a confidence gauge 345. The GUI 305 may represent any user interface that may be viewed by the user on the display device 112 via the communication client 114 in which the user communication 325 and the automated agent communication 330 is tracked during the communication session. The GUI 305 may include the input text box 320 that allows the user to enter an input. The input text box 320 may specifically be used to enter a text based communication. However, as noted above, the input text box 320 may represent any manner in which a communication may be received as an input from the user (e.g., a speak icon used to enter an audio based communication which is translated into a text based communication). The user avatar 310 and the automated agent avatar 315 may be provided to note the individual/entity participating in the communication session.

The GUI 310 also shows the various assertiveness features according to the exemplary embodiments. As described in detail above, the assertiveness features may include a tone of response, a mental model intervention, an automated agent personality representation, and a confidence score. As shown in the exemplary scenario 300, the tone of response may be read in the automated agent communication 330. As illustrated, the user communication 325 may include a request for a refund. However, the user may have inadvertently entered the user communication 325 with typographical errors. As noted above, a conventional approach may simply respond with a predefined response indicating that the automated agent did not understand the user communication 325. However, according to the exemplary embodiments, the automated agent may determine that the response has a relatively low confidence score but still provides a dynamic response to further the communication session. For example, as shown in the confidence gauge 345, the response has a 15% confidence score (e.g., 0.15 in the range described above converted to a percentage). In the scenario 300, the automated agent may formulate the response with a request to confirm that the request is for a refund using a low assertive tone while also including a request for information based on an assumption that the response is correct (e.g., "have you returned the order yet?") to further the communication session. Through the proper assertive tone based on the confidence score of the response and the confidence score being shown on the confidence gauge 345, the user may develop a more accurate mental model with regard to interacting with the automated agent.

The mental model intervention may be included as the intervention information 335. In the exemplary scenario 300, the mental model intervention may show a knowledge distribution of the automated agent such as information directed towards a capability of the automated agent and/or information that is available to the automated agent. As illustrated, the intervention information 335 may be included as an accompanying text display with the corresponding automated agent communication 330. However, the intervention information 335 may be provided in various manners such as a pop up display or other display technique. By incorporating the mental model intervention such as the intervention information 335, the user may further develop a more accurate mental model as expectations of the user for the automated agent may be better defined.

The automated agent personality representation may be included as the anthropomorphic graphic representation 340 of the automated agent. The anthropomorphic graphic representation 340 may be configured to display various facial expressions (e.g., based on the automated agent avatar 315) indicative of the confidence score of the response (e.g., the automated agent communication 330) being provided for an input from the user (e.g., the user communication 325). For example, as illustrated in the scenario 300, the automated agent may have determined that the automated agent communication 330 has a confidence score of 15%. Based on the relatively low confidence score and based on a range of confidence scores as defined by confidence threshold(s), the automated agent may determine an expression to be expressed by the graphical representation of the automated agent. For example, the anthropomorphic graphic representation 340 is to have a facial expression, gesticulation, and/or avatar orientation expressing confusion or unsurety. For example, the facial expression may include furrowed eyebrows and straight mouth; the gesticulation may include a shrugging shoulders motion; and the avatar orientation may include a tilted head with a raised hand by the mouth. By incorporating these anthropomorphic properties, the exemplary embodiments may promote positive interactions with the user and improve effectiveness of interactions via the user communication 325 and the automated agent communication 330.

FIG. 4 is directed to the exemplary scenario 400 where a response to a user input has a relatively high confidence score. As illustrated in the exemplary scenario 400, a GUI 405 includes a user avatar 410, an automated agent avatar 415, an input text box 420, a user communication 425, an automated agent communication 430, intervention information 435, an anthropomorphic graphic representation 440 of the automated agent, and a confidence gauge 445. The individual components of the GUI 405 may be substantially similar to the corresponding components of the GUI 305.

The GUI 410 also shows the various assertiveness features according to the exemplary embodiments such as a tone of response, a mental model intervention, an automated agent personality representation, and a confidence score. As shown in the exemplary scenario 400, the tone of response may be read in the automated agent communication 430. As illustrated, the user communication 425 may include a request for a return. The automated agent may determine that the response has a relatively high confidence score. For example, as shown in the confidence gauge 445, the response has a 85% confidence score (e.g., 0.85 in the range described above converted to a percentage). In the scenario 400, the automated agent may formulate the response that positively confirms an understanding of the user communication 425 with the appropriate followup to the user communication 425 (e.g., "may I have your order number please?") to further the communication session. The high confidence value may also result in high assertive cues (e.g., "Sure") from the automated agent. Through the proper assertive tone based on the confidence score of the response and the confidence score being shown on the confidence gauge 445, the user may develop a more accurate mental model with regard to interacting with the automated agent.

The mental model intervention may be included as the intervention information 435 which may be substantially similar to the intervention information 335. By incorporating the mental model intervention such as the intervention information 435, the user may further develop a more accurate mental model as expectations of the user for the automated agent may be better defined.

The automated agent personality representation may be included as the anthropomorphic graphic representation 440 of the automated agent. The anthropomorphic graphic representation 440 may be configured to display various facial expressions (e.g., based on the automated agent avatar 415) indicative of the confidence score of the response (e.g., the automated agent communication 430) being provided for an input from the user (e.g., the user communication 425). For example, as illustrated in the scenario 400, the automated agent may have determined that the automated agent communication 430 has a confidence score of 85%. Based on the relatively high confidence score and based on a range of confidence scores as defined by confidence threshold(s), the automated agent may determine that the anthropomorphic graphic representation 440 is to have a facial expression, gesticulation, and/or avatar orientation expressing surety and confidence. For example, the facial expression may include a smiling mouth; the gesticulation may be omitted; and the avatar orientation may be a relaxed pose. By incorporating these anthropomorphic properties, the exemplary embodiments may promote positive interactions with the user and improve effectiveness of interactions via the user communication 425 and the automated agent communication 430.

As described above, the automated agent may continually be updated and trained to improve its performance as communication sessions with users are completed. For example, the models and/or learnings of the automated agent may be updated at predetermined intervals (e.g., maintenance cycles), at the occurrence of an event (e.g., a conclusion of a communication session), etc. The performance of the automated agent may be updated with regard to the determination of the confidence score and/or the determination of the assertiveness features. In this manner, the assertiveness module 134 may collect and store user interactions and confidence values (e.g., in the historical data 122). The assertiveness module 134 may assert the knowledge distribution of the AI agent to improve interaction between the automated agent and the user. The assertiveness module 134 may be periodically retrained using the data that has been collected to improve the accuracy of any model or basis upon which to determine the confidence score and/or the assertiveness features.

The exemplary embodiments are configured to incorporate an assertiveness module to help a user develop an accurate mental model of an underlying system with which the user is interacting. The exemplary embodiments provide assertiveness features that are graphically represented on a user interface of a communication session between an automated agent and the user. The assertiveness features may include a tone of response represented in a communication from the automated agent, a mental model intervention providing a knowledge distribution of the automated agent, a personality representation in which a graphical representation of the automated agent is shown with anthropomorphic characteristics indicative of the confidence score of responses being provided, and a confidence value directly indicating the automated agent's confidence with regard to a provided response. The assertiveness module according to the exemplary embodiments may represent the likely accuracy of the automated agent's response matching the user's expectation, may communicate the automated agent's knowledge distribution through an intervention, may use word embedding techniques based on knowledge base data to evaluate input and formulate responses with the appropriate assertive tone, and may collect user input and evaluation for self-improvement via model retraining.

Figure 5:
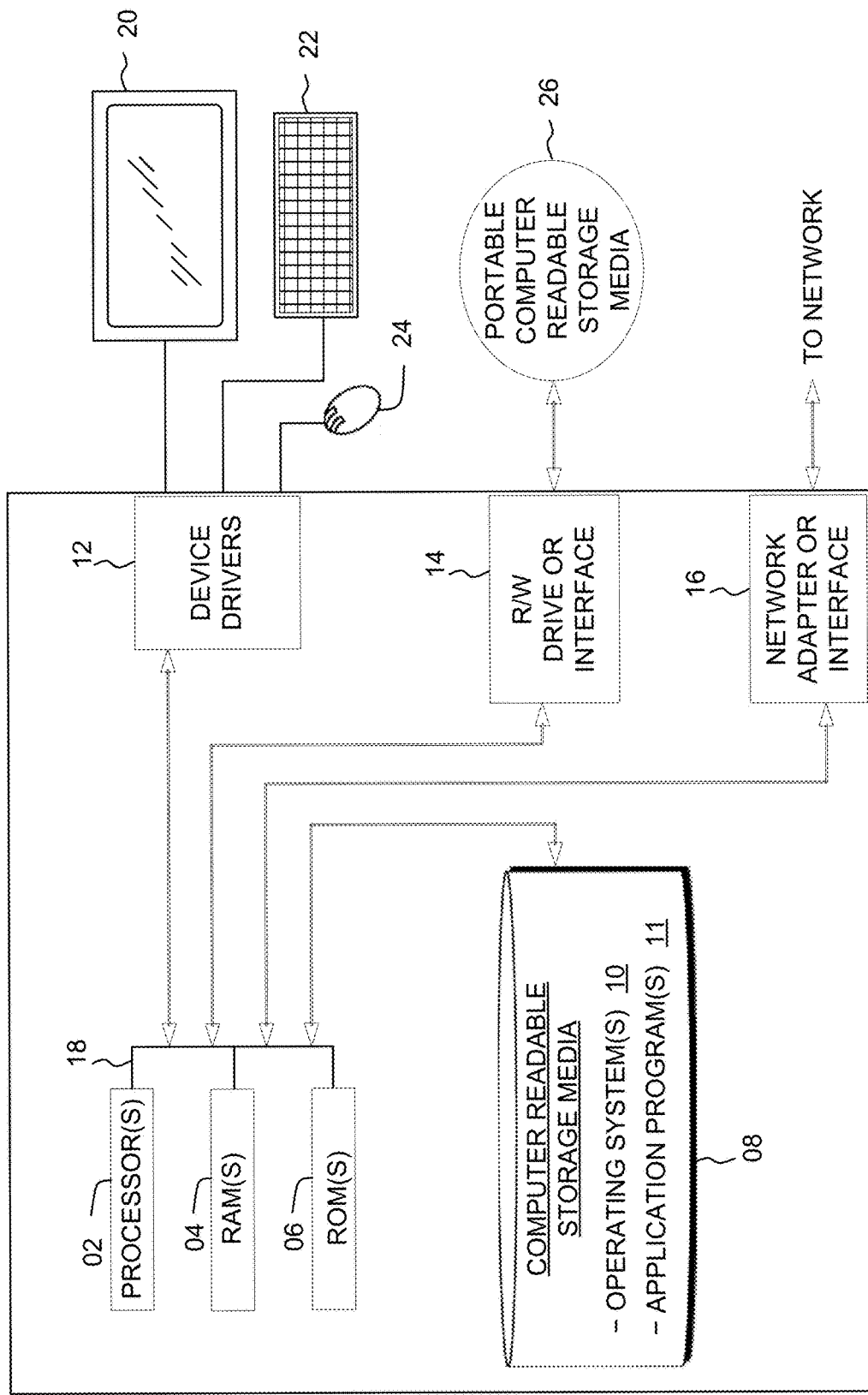
FIG. 5 depicts an exemplary block diagram depicting the hardware components of the agent response system 100 of FIG. 1, in accordance with the exemplary embodiments.

FIG. 5 depicts a block diagram of devices within the agent response system 100 of FIG. 1, in accordance with the exemplary embodiments. It should be appreciated that FIG. 5 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
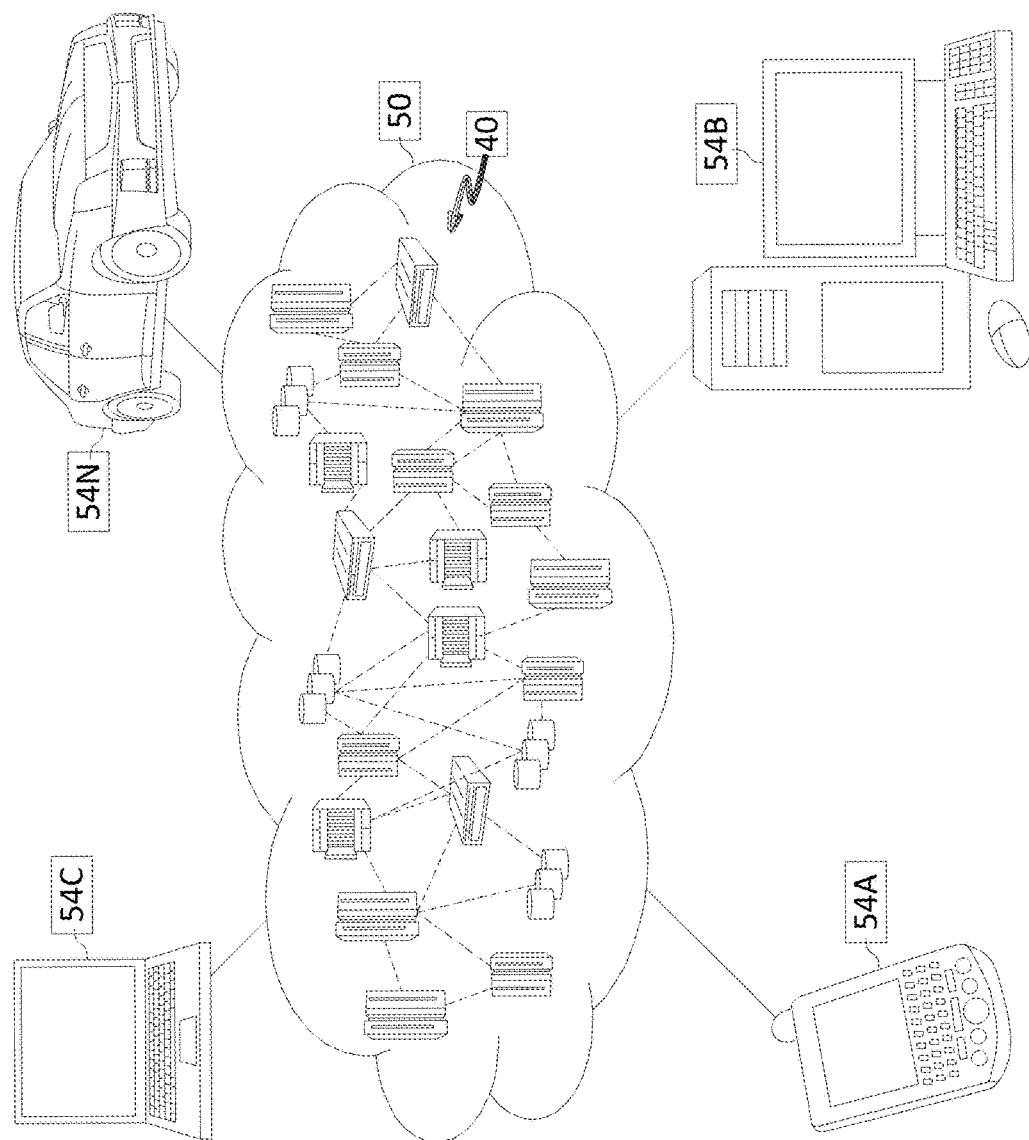
FIG. 6 depicts a cloud computing environment, in accordance with the exemplary embodiments.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
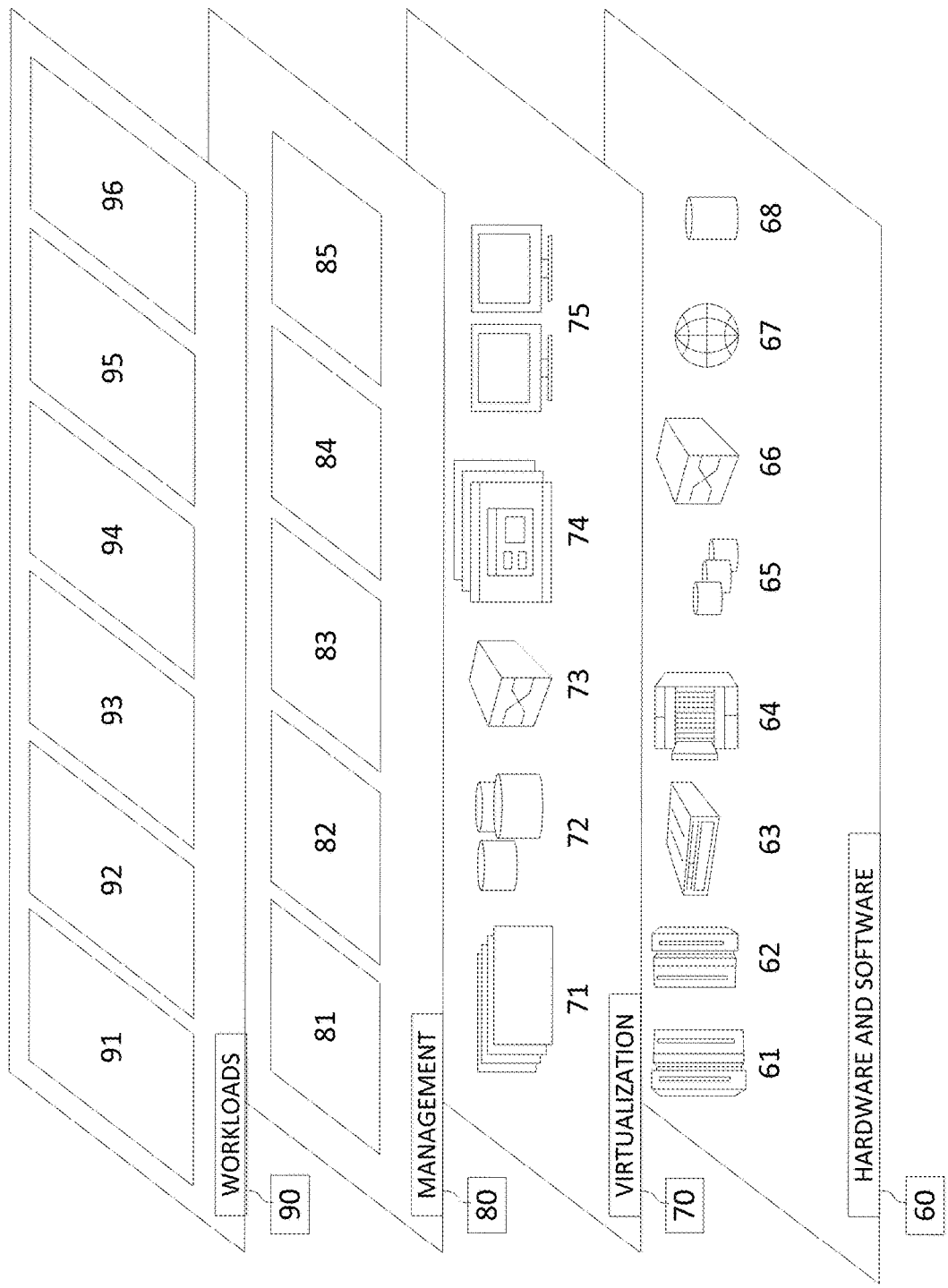
FIG. 7 depicts abstraction model layers, in accordance with the exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and assertiveness processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for generating an accurate mental model of an automated agent, the method comprising:
    receiving an input from a user device associated with a user during a communication session between the user and the automated agent;
    determining a response to the input;
    determining a confidence score of the response relative to a confidence threshold;
    determining an assertiveness feature associated with the response, the assertiveness feature comprising an expression of the automated agent based on the confidence score; and
    transmitting the response and the assertiveness feature to the user device, the expression configured to update anthropomorphic characteristics of a graphical representation of the automated agent shown on a graphical user interface of the communication session displayed on a display device of the user device, and wherein the transmitted response includes a request for information based on an assumption that the response correctly addresses the input.

2. The computer-implemented method of claim 1, wherein the assertiveness feature further comprises a tone to be applied to the response, the tone including a use of corresponding terms indicative of the confidence score.

3. The computer-implemented method of claim 1, wherein the assertiveness feature further comprises a mental model intervention, the mental model intervention including knowledge distribution information of the automated agent.

4. The computer-implemented method of claim 1, wherein the assertiveness feature further comprises a confidence gauge indicating the confidence score associated with the response.

5. The computer-implemented method of claim 1, further comprising:
retraining a model from which the confidence score is determined, from which the assertiveness feature is determined, or a combination thereof, based on the communication session.

6. The computer-implemented method of claim 1, wherein the expression is one of confusion as a result of the confidence score not satisfying the confidence threshold or understanding as a result of the confidence score satisfying the confidence threshold.

7. A computer program product for generating an accurate mental model of an automated agent, the computer program product comprising:
one or more computer-readable tangible storage medium and program instructions stored on at least one of the one or more tangible storage medium, the program instructions executable by a processor, the program instructions comprising:
receiving an input from a user device associated with a user during a communication session between the user and the automated agent;
determining a response to the input;
determining a confidence score of the response relative to a confidence threshold;
determining an assertiveness feature associated with the response, the assertiveness feature comprising an expression of the automated agent based on the confidence score; and
transmitting the response and the assertiveness feature to the user device, the expression configured to update anthropomorphic characteristics of a graphical representation of the automated agent shown on a graphical user interface of the communication session displayed on a display device of the user device, and wherein the transmitted response includes a request for information based on an assumption that the response correctly addresses the input.

8. The computer program product of claim 7, wherein the assertiveness feature further comprises a tone to be applied to the response, the tone including a use of corresponding terms indicative of the confidence score.

9. The computer program product of claim 7, wherein the assertiveness feature further comprises a mental model intervention, the mental model intervention including knowledge distribution information of the automated agent.

10. The computer program product of claim 7, wherein the assertiveness feature further comprises a confidence gauge indicating the confidence score associated with the response.

11. The computer program product of claim 7, wherein the program instructions further comprise:
retraining a model from which the confidence score is determined, from which the assertiveness feature is determined, or a combination thereof, based on the communication session.

12. The computer program product of claim 7, wherein the expression is one of confusion as a result of the confidence score not satisfying the confidence threshold or understanding as a result of the confidence score satisfying the confidence threshold.

13. A computer system for generating an accurate mental model of an automated agent, the computer system comprising:
one or more computer processors, one or more computer-readable storage media, and program instructions stored on the one or more of the computer-readable storage media for execution by at least one of the one or more processors capable of performing a method, the method comprising:
receiving an input from a user device associated with a user during a communication session between the user and the automated agent;
determining a response to the input;
determining a confidence score of the response relative to a confidence threshold;
determining an assertiveness feature associated with the response, the assertiveness feature comprising an expression of the automated agent based on the confidence score; and
transmitting the response and the assertiveness feature to the user device, the expression configured to update anthropomorphic characteristics of a graphical representation of the automated agent shown on a graphical user interface of the communication session displayed on a display device of the user device, and wherein the transmitted response includes a request for information based on an assumption that the response correctly addresses the input.

14. The computer system of claim 13, wherein the assertiveness feature further comprises a tone to be applied to the response, the tone including a use of corresponding terms indicative of the confidence score.

15. The computer system of claim 13, wherein the assertiveness feature further comprises a mental model intervention, the mental model intervention including knowledge distribution information of the automated agent.

16. The computer system of claim 13, wherein the assertiveness feature further comprises a confidence gauge indicating the confidence score associated with the response.

17. The computer system of claim 13, wherein the method further comprises:
retraining a model from which the confidence score is determined, from which the assertiveness feature is determined, or a combination thereof, based on the communication session.

18. The computer system of claim 13, wherein the expression is one of confusion as a result of the confidence score not satisfying the confidence threshold or understanding as a result of the confidence score satisfying the confidence threshold.

* * * * *